US008485040B2

(12) United States Patent
Petersen

(10) Patent No.: US 8,485,040 B2
(45) Date of Patent: Jul. 16, 2013

(54) FLAME ARRESTOR FOR PROCESS TRANSMITTER

(75) Inventor: Eric Paul Petersen, Minnetonka, MN (US)

(73) Assignee: Rosemount Inc., Eden Prairie, MN (US)

(*) Notice: Subject to any disclaimer, the term of this patent is extended or adjusted under 35 U.S.C. 154(b) by 143 days.

(21) Appl. No.: 13/065,088

(22) Filed: Mar. 14, 2011

(65) Prior Publication Data

US 2012/0234097 A1   Sep. 20, 2012

(51) Int. Cl.
*G01L 7/00*   (2006.01)
*F02B 77/08*   (2006.01)

(52) U.S. Cl.
USPC .......................................................... 73/706

(58) Field of Classification Search
USPC .......................................................... 73/706
See application file for complete search history.

(56) References Cited

U.S. PATENT DOCUMENTS

| | | | |
|---|---|---|---|
| 2,868,045 A * | 1/1959 | Fried | 407/9 |
| 4,192,658 A | 3/1980 | Worrell | |
| 4,733,563 A | 3/1988 | Nava et al. | |
| 4,785,158 A | 11/1988 | Gaul | |
| 4,970,898 A | 11/1990 | Walish et al. | |
| 5,040,277 A * | 8/1991 | Dessouky | 29/240 |
| 5,203,296 A * | 4/1993 | Hart | 123/198 D |
| 5,287,746 A | 2/1994 | Broden | |
| 5,583,294 A | 12/1996 | Karas | |
| 5,709,337 A | 1/1998 | Moser et al. | |
| 5,948,988 A | 9/1999 | Bodin | |
| 6,050,145 A | 4/2000 | Olson et al. | |
| 6,295,875 B1 | 10/2001 | Frick et al. | |
| 6,609,427 B1 | 8/2003 | Westfield et al. | |
| 7,398,691 B2 | 7/2008 | Lange et al. | |
| 7,681,456 B2 | 3/2010 | Hausler | |
| 2011/0108292 A1 * | 5/2011 | Moyer | 169/48 |

OTHER PUBLICATIONS

International Search Report and Written Opinion from PCT Application Serial No. PCT/US2012/028913, dated Nov. 1, 2012, 10 pages.

* cited by examiner

*Primary Examiner* — Lisa Caputo
*Assistant Examiner* — Punam Roy
(74) *Attorney, Agent, or Firm* — Kinney & Lange, P.A.

(57) ABSTRACT

A process transmitter for sensing a process variable includes a transmitter housing, a sensor, transmitter circuitry, a passageway and a flame arrestor. The transmitter housing has an interior. The sensor is disposed within the interior, senses a process variable of an industrial process and generates a sensor signal. The transmitter circuitry is disposed within the interior and connects to the sensor. The passageway is in communication with the sensor and extends through the interior of the transmitter housing. The passageway has a first cross-sectional profile. The flame arrestor is positioned in the passageway. The flame arrestor has a second cross-sectional profile different from the first cross-sectional profile. The flame arrestor produces a path in an interior of the passageway having a smaller cross-sectional area than that of the first cross-sectional profile of the passageway.

20 Claims, 6 Drawing Sheets

FLAME ARRESTOR FOR PROCESS TRANSMITTER

BACKGROUND

The present invention relates generally to industrial process transmitters used in industrial process control systems. More particularly the present invention relates to flame arrestors for industrial process transmitters.

Process instruments are used to monitor process parameters, such as pressure, temperature, flow and level, of process fluids used in industrial processes. For example, process transmitters are typically employed in industrial manufacturing facilities at multiple locations to monitor a variety of process parameters along various production lines. Process transmitters include sensors that produce an electrical output in response to physical changes in the process parameter. For example, pressure transmitters include pressure transducers that produce an electrical output as a function of the pressure of a process fluid, such as in water lines, chemical tanks or the like. Each process transmitter also includes transmitter electronics for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics that transmit the electrical output over a control loop or network to a central monitoring location such as a control room. Configured as such, the process parameter can be regulated from the control room by including automated switches, valves, pumps and other similar components in the process control system and the control loop.

Sensors within the transmitter respond to a physical change in the process fluid being monitored. For example, pressure sensors used in pressure transmitters include a flexible sensor element such as a diaphragm or capacitor plate. The sensor element is typically connected to the process fluid through a simple hydraulic system that communicates the process fluid pressure to the sensor. The hydraulic system comprises a sealed passageway in which the sensor element is positioned at a first end, and a flexible isolation diaphragm is positioned at a second end to engage the process fluid. The sealed passageway is filled with a precise amount of hydraulic fluid that adjusts the position of the sensor element as the process fluid influences the isolation diaphragm. As the pressure of the process fluid changes, the position of the sensor element changes, resulting in a proportional change in a pressure sensor signal.

Industrial process transmitters are often used in facilities with environments where various gases or compounds that have the potential to ignite are present. For example, transmitters are often operated in natural gas processing plants or facilities where hydrogen gas is used. Alternatively, industrial process transmitters may be used to monitor process fluids which are themselves combustible. In order to ensure overall safe operation of the facility, industrial process transmitters are certified to be explosion-proof or flame-proof to prevent flames from being able to pass through the transmitter. For example, electronics within the transmitter may cause a spark that has the potential to ignite a gas in the environment of the facility or a process fluid in the case of a ruptured hydraulic passageway. Thus, it is desirable to ensure that all passageways connecting the interior of the transmitter to the exterior environment be configured to extinguish or quench flames traveling through the passageways.

Conventional configurations for flame-proofing sealed hydraulic passageways, such as described in U.S. Pat. No. 4,970,898 to Walish et al. and assigned to Rosemount Inc., Eden Prairie, Minn., comprise machining a long and narrow cylindrical path through a transmitter component, such as a flange or a plug. The flange or plug typically includes a slab of stainless steel having a thickness commensurate with the appropriate length required to provide the flame-proof path. Flame-proof paths are typically a function of the length to diameter (L/D) ratio of the passageway, as well as the ratio of the perimeter to area (P/A) of the passageway. Adequate L/D ratios, however, typically lengthen the thickness of the flange or plug over what would typically be required for structural purposes. Furthermore, in order to machine such a small diameter through such a thick slab, electrical discharge machining (EDM) is often used. EDM operations, however, produce a slag layer, which comprises a layer of material lining the hole consisting of re-cast material of the slab. The slag is dirty and difficult to clean. The slag also harbors moisture, which may interfere with operation of the pressure transmitter and hydraulic system by, for example, altering the dielectric of the sensor. EDM processes are also expensive relative to conventional machining processes, such as drilling operations. There is, therefore, a need for improved flame-proof paths in industrial process transmitters, particularly those that are cleaner, smaller and less expensive.

SUMMARY

The present invention is directed to a transmitter for sensing a process variable in a process control system. The process transmitter includes a transmitter housing, a sensor, transmitter circuitry, a passageway and a flame arrestor. The transmitter housing has an interior. The sensor is disposed within the interior, senses a process variable of an industrial process and generates a sensor signal. The transmitter circuitry is disposed within the interior and connects to the sensor. The passageway is in communication with the sensor and extends through the interior of the transmitter housing. The passageway has a first cross-sectional profile. The flame arrestor is positioned in the passageway. The flame arrestor has a second cross-sectional profile different from the first cross-sectional profile. The flame arrestor produces a path in an interior of the passageway having a smaller cross-sectional area than that of the first cross-sectional profile of the passageway.

DETAILED DESCRIPTION

Figure 1:
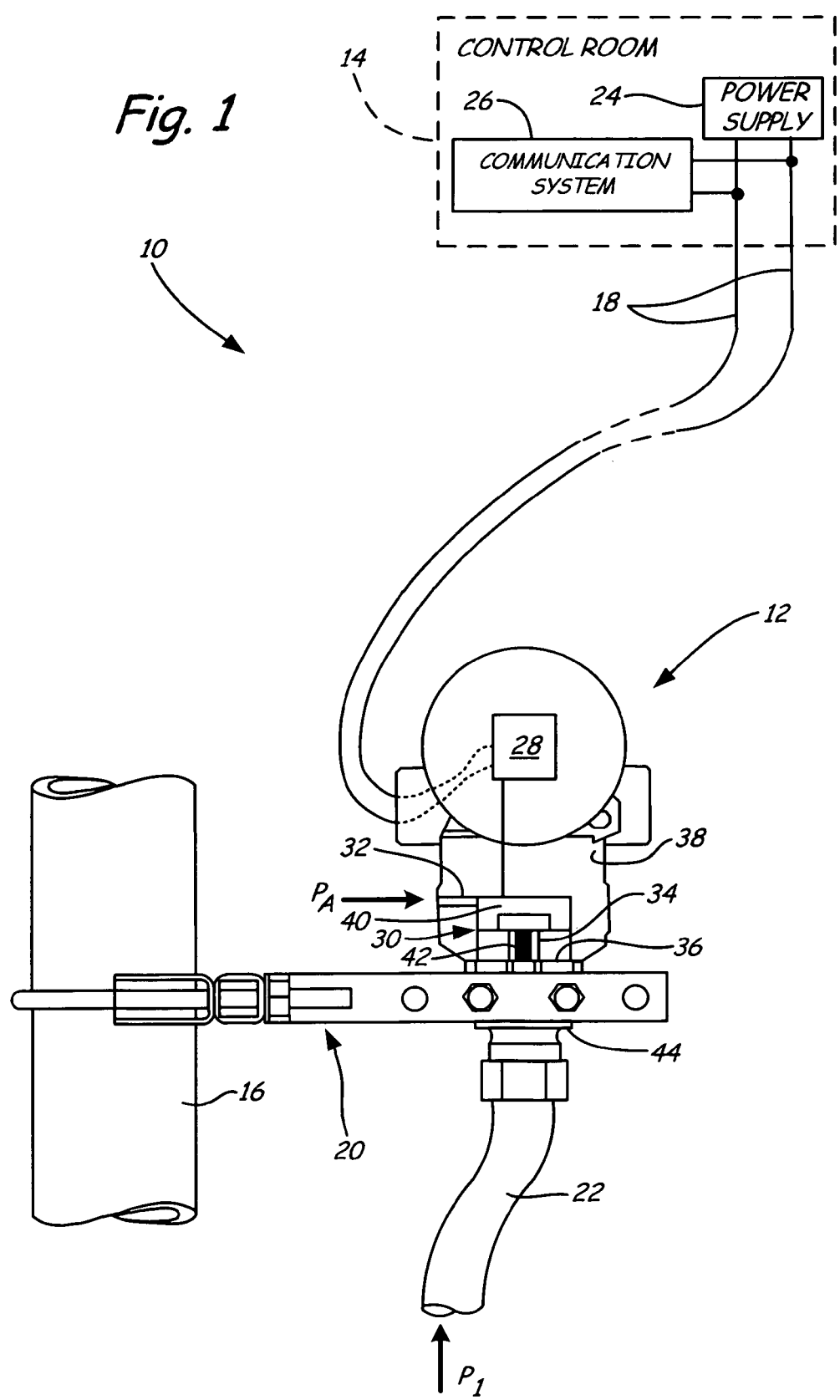
FIG. 1 shows a process control system schematic including a control room, a process fluid source and an in-line process transmitter in which a flame arrestor of the present invention is used.

FIG. 1 shows process control system 10, which includes process transmitter 12, control room 14 and process pipe 16. Process transmitter 12 is connected to control room 14 through control loop 18, and to process pipe 16 through bracket 20. Pressure of a process fluid, such as a fluid within pipe 16, is fluidly connected to transmitter 12 through process connection 22. Control room 14 supplies power to transmitter 12 from power supply 24 over control loop 18. Control loop 18 also enables communication system 26 to transmit data from control room 14 to transmitter 12, and to receive data from transmitter 12. In various embodiments, control loop 18 and communication system 26 operate over a digital network protocol such as FOUNDATION™ Fieldbus, or an analog network protocol such as a 4-20 mA HART® system. In other embodiments, transmitter 12 and control room 14 communicate over a wireless network, such as WirelessHART®. In still other embodiments, output of transmitter 12 is readable by a handheld interrogator device linked by wires or wirelessly with pressure transmitter 12, or by a local display disposed within the housing of transmitter 12. Process transmitter 12 includes a gauge pressure sensor that senses the pressure difference between process pressure $P_1$ of a process fluid and pressure $P_A$ of the atmosphere, and then relays an electronic signal to control room 14 over control loop 18.

Pressure transmitter 12 includes transmitter circuitry 28, sensor 30, reference path 32, isolation path 34, isolation diaphragm 36, housing 38, flexible sensor element 40 and flame arrestor 42. Transmitter circuitry 28 is electronically connected to control loop 18 and sensor 30 using any suitable means that are known in the art. Transmitter circuitry 28 includes components and electronics for transmitting electrical signals representing the pressure sensed by pressure sensor 30 over control loop 18 to control room 14 or a local display, such as an LCD screen disposed within housing 38, or both. Circuitry 28 also conditions the output of sensor 30 into a format compatible with control loop 18. Based on the data received from sensor 30 and transmitter 12, control room 14 is able to adjust process parameters either through control loop 18 or another control loop. For example, control room 14 can adjust the flow of process fluid within pipe 16 by adjusting appropriate actively controlled valves.

Pressure sensor 30 is connected to passageways that extend through the interior of housing 38. Reference path 32 connects sensor 30 to the exterior of housing 38 to allow atmospheric pressure $P_A$ to engage flexible sensor element 40. Isolation path 34 connects sensor 30 to the exterior of housing 38 to allow process pressure $P_1$ to engage flexible sensor element 40 through a hydraulic fill fluid. Flame arrestor 42 is positioned within a passageway within the interior of housing 38 to prevent flames from traveling into or out of housing 38. In the embodiment shown, flame arrestor 42 is positioned in isolation path 34. In other embodiments, flame arrestor 42 is positioned in reference path 32 or some other passageway within transmitter 12.

Sensor 30 comprises a pressure sensor having flexible sensor element 40. In one embodiment, flexible sensor element 40 comprises a capacitive pressure sensor as is known in the art. For example, capacitance-based pressure sensor cells are described in U.S. Pat. No. 6,295,875 to Frick et al., which is assigned to Rosemount Inc., Eden Prairie, Minn. In another embodiment, flexible sensor element 40 comprises a strain gage sensor as is known in the art. For example, strain gage pressure sensor cells are described in U.S. Pat. No. 5,709,337 to Moser et al., which is assigned to Rosemount Inc., Eden Prairie, Minn. Flexible sensor element 40 moves in response to atmospheric pressures $P_A$ presented to sensor 30 through reference path 32. Flexible sensor element 40 also moves in response to process pressure $P_1$ presented to sensor 40 through isolation path 34 and connection 22. In one embodiment, connection 22 comprises an impulse pipe for connecting to a process pipe through a process manifold. In another embodiment connection 22 comprises a capillary for connecting to a remote seal assembly.

Isolation path 34 comprises a passageway that is fluidly coupled to sensor 30 at a first end and isolation diaphragm 36 at a second end. Isolation diaphragm 36 is mounted to a plug that is connected to housing 38 near coupling 44. The exterior of coupling 44 attaches to bracket 20 such that transmitter 12 is supported by pipe 16. The interior of coupling 44 attaches a coupling connected to connection 22 to fluidly connect a process fluid to isolation diaphragm 36. Isolation path 34 is supplied with a sensor fill fluid to form a hydraulic passageway. The fill fluid is substantially incompressible to transmit pressures $P_1$ from isolation diaphragm 36 to sensor 30. The fill fluid typically comprise a silicone-oil hydraulic fluid, such as DC 200®, DC 704® or Syltherm XLT® silicone-oil as is commercially available from Dow Corning Corporation, Midland, Mich. However, other fluids are also used. The fill fluid displaces the position of flexible sensor element 40 within sensor 30, which changes the electronic pressure signal generated by sensor 30, thus indicating a change in process pressures $P_1$.

Reference path 32 connects the exterior of housing 38 to flexible sensor element 40 within sensor 30. Reference path 32 conveys atmospheric pressure $P_A$ from outside of transmitter 12 to flexible sensor element 40. Likewise, atmospheric pressure $P_A$ acts on the source of pressure connected to isolation path 34 such that changes in ambient pressure act equally on both sides of sensor element 40. Sensor 30 senses a differential pressure between the process fluid and atmospheric pressure, resulting in a gage pressure reading. Thus, isolation path 34 and reference path 32 hydraulically link a process fluid and atmospheric pressure with sensor 30, wherein $P_1$ is commonly referred to the high pressure side and $P_A$ is commonly referred to as the low pressure side.

Isolation path 34 provides flame-proofing features to transmitter 12. Flame arrestor 42 improves the manufacturability and performance of the flame-proofing features of transmitter 12. Use of flame arrestor 42 allows the manufacture of isolation path 34 to be performed using conventional machining techniques that are inexpensive, while also avoiding use of less clean operations. Flame arrestor 42 can be made from standard materials, such as bar stock or wire. As is discussed with reference to FIGS. 2-7, flame arrestor 42 can be shaped to increase the cross-sectional area and surface area of isolation path 34, as compared to conventional flame-quenching paths, while also producing one or more smaller passageways through isolation path 34 without inhibiting performance of hydraulic fluid within isolation path 34 or impairing the flame-proofing performance of transmitter 12.

Figure 2:
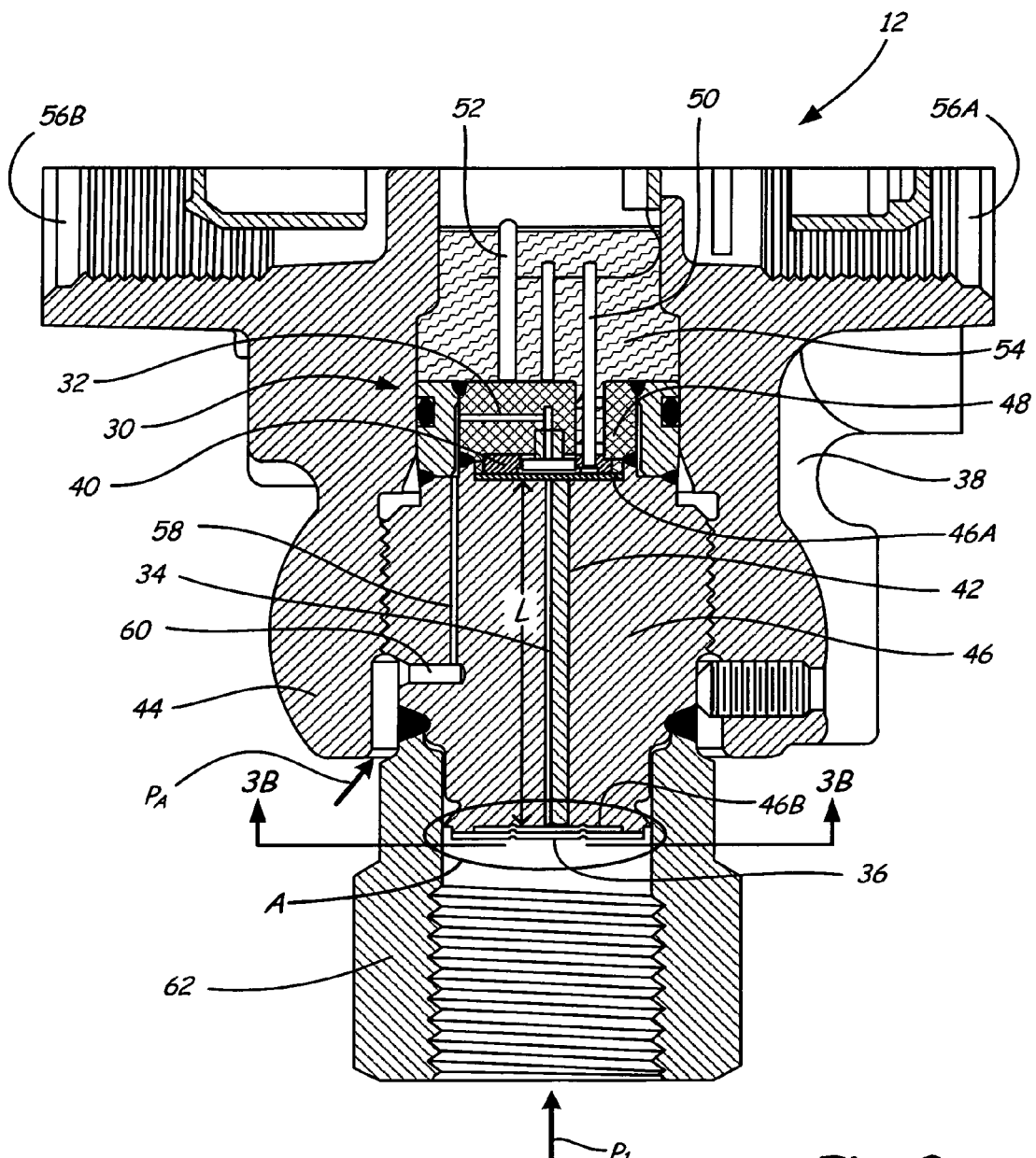
FIG. 2 shows a partial cross-sectional view of the process transmitter of FIG. 1 having an isolating plug with a flame arrestor of the present invention used in a hydraulic isolation path.

FIG. 2 shows a partial cross-sectional view of process transmitter 12 having isolating plug 46 with flame arrestor 42 used in hydraulic isolation path 34. Pressure sensor 30 includes flexible sensor element 40, header 48, fill tube 50, electrical lead 52 and cap 54. Transmitter housing 38 includes conduit connectors 56A and 56B, into which wires of control loop 18 extend to connect to transmitter electronics 28 (FIG.

1). Plug 46 includes isolation path 34, vent hole 58 and inlet 60. Isolation path 34 extends longitudinally through length L of plug 46, between end surfaces 46A and 46B. Thus, the distance between end surface 46A and end surface 46B comprises length L of plug 46. In one embodiment, length L is approximately 1 inch (~2.54 cm). Isolation path 34 opens to sensor element 40 at a first end and to isolation diaphragm 36 at a second end. Vent hole 58 extends into plug 46 and opens to reference path 32 in sensor 30 at a first end and to inlet 60 at a second end. Coupling 62 is welded to plug 46 and connection 22 (FIG. 1) is threaded into coupling 62.

Plug 46 comprises a slab of material shaped to be used as a transmitter component of transmitter 12. In the described embodiment, the slab of material is shaped as a plug to be used in an in-line pressure sensor connected with housing 38 and coupling 62. In other embodiments, the slab of material is shaped as an isolator flange to be used in a differential pressure transmitter. For example, the present invention can also be included in process transmitters having multiple flame paths, such as differential pressure transmitters having co-planar flanges with two hydraulic passageways. In yet other embodiments, the present invention may be used in remote seal assemblies. The slabs are formed of durable and corrosion resistant material. In various embodiments, plug 46 is comprised of stainless steel or Hastelloy®.

Flexible sensor element 40 is mounted on plug 46 and covered with header 48, which is welded to end surface 46A. Plug 46 is threaded into connector 44 so as to position sensor 30 within housing 38. Electrical lead 52 extends from sensor 30 into housing 38 to connect to transmitter electronics 28. Fill tube 50 extends from sensor 30 to permit hydraulic fluid to be introduced into isolation path 34. Cap 54, such as an epoxy potting compound, seals sensor 30 within housing 38 at end surface 46A. Coupling 62 is welded to plug 46 near end surface 46B.

Atmospheric pressure $P_A$ enters transmitter 12 through a gap between connector 44 and plug 46. Atmospheric pressure $P_A$ travels through inlet 60, vent hole 58 and reference path 32 to act on flexible sensor element 40. Connector 44, inlet 60, vent hole 58 and reference path 32 form a serpentine path that prevents contaminants and other debris from entering sensor 30. Vent hole 58 serves as a flame-quenching channel. In the embodiment shown, vent hole 58 has a diameter size based on the distance between header 48 and inlet 60. For example, as is known in the art, a length to diameter (L/D) ratio of approximately 7 or greater provides adequate flame quenching properties. Thus, flames are prevented from migrating through vent hole 58 when originating either inside or outside of transmitter housing 38.

Process pressure $P_1$ from a process fluid introduced from coupling 62 acts on isolation diaphragm 36. Process pressure $P_1$ asserts pressure on diaphragm 36, which then relays the pressure through a hydraulic fill fluid within isolation path 34 to flexible sensor element 40. Isolation path 34 and flame arrestor 42 form a flame-quenching channel. In the embodiment shown, isolation path 34 is provided as a large sized bore into which a differently shaped flame arrestor 42 is inserted to form a small sized flame-quenching path. Flame arrestor 42 occupies space within isolation path 34 to reduce the overall cross-sectional area of isolation path 34. Flame arrestor 42 has a different cross-sectional profile than that of isolation path 34, which allows flame arrestor 42 to be held in place within isolation path 34, while also allowing hydraulic fluid to pass through uninhibited.

Figure 3A:
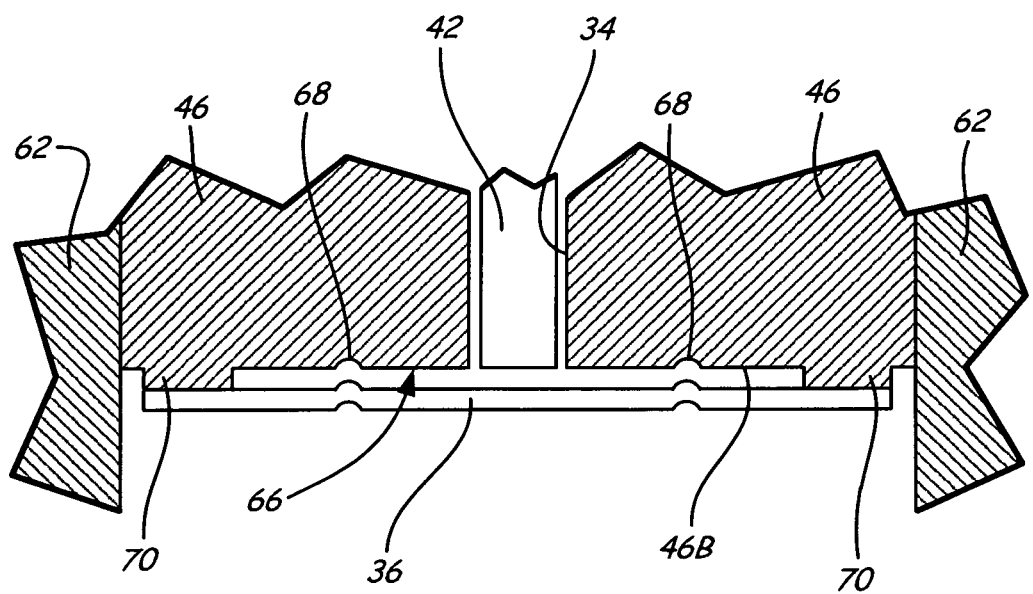
FIG. 3A shows a close-up view of the isolating plug and an isolating diaphragm of FIG. 2, as taken at callout A.
Figure 3B:
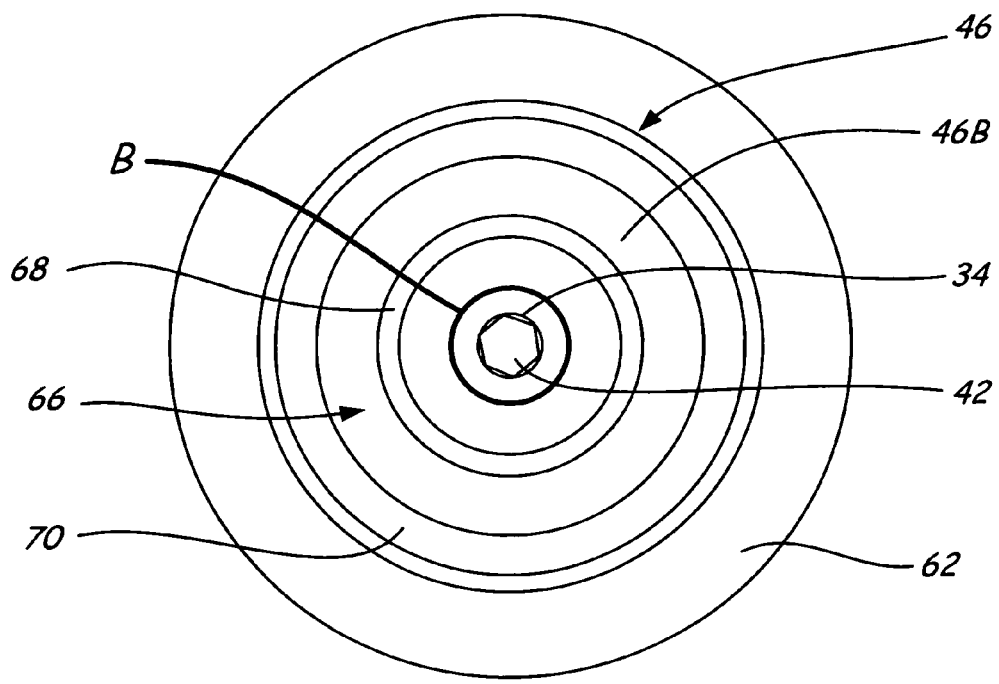
FIG. 3B shows an end view of the isolation path in which a hexagonal flame arrestor is inserted, as taken at section 3B-3B of FIG. 2.

FIG. 3A shows a close-up view of plug 46 and isolation diaphragm 36, as shown at callout A of FIG. 2. FIG. 3B shows an end view of end surface 46B having hexagonal flame arrestor 42 inserted into isolation path 34, as taken at section 3B-3B of FIG. 2. Isolation diaphragm 36 is removed in FIG. 3B to show isolator surface 66. FIGS. 3A and 3B are discussed concurrently. Isolator surface 66 comprises a surface that is recessed into plug 46 with respect to end surface 46B to provide isolation diaphragm 36 space to flex. Isolator surface 66 includes convolution 68 and isolator rim 70. Convolution 68 comprises a corrugation that shapes and supports isolation diaphragm 36, as is known in the art. However, convolution 68 may be omitted in other embodiments. Isolator rim 70 comprises a flange extending around the edge of isolator surface 66 to which isolation diaphragm 36 is welded or otherwise joined. Isolation path 34 extends into isolator surface 66 and extends completely through length L (FIG. 2) of plug 46. Flame arrestor 42 is inserted into isolation path 34 to extend substantially across length L. As is better shown in FIG. 4, flame arrestor 42 is lodged within isolation path 34 to define a plurality of hydraulic fluid passages that form smaller flame-quenching paths.

Figure 4:
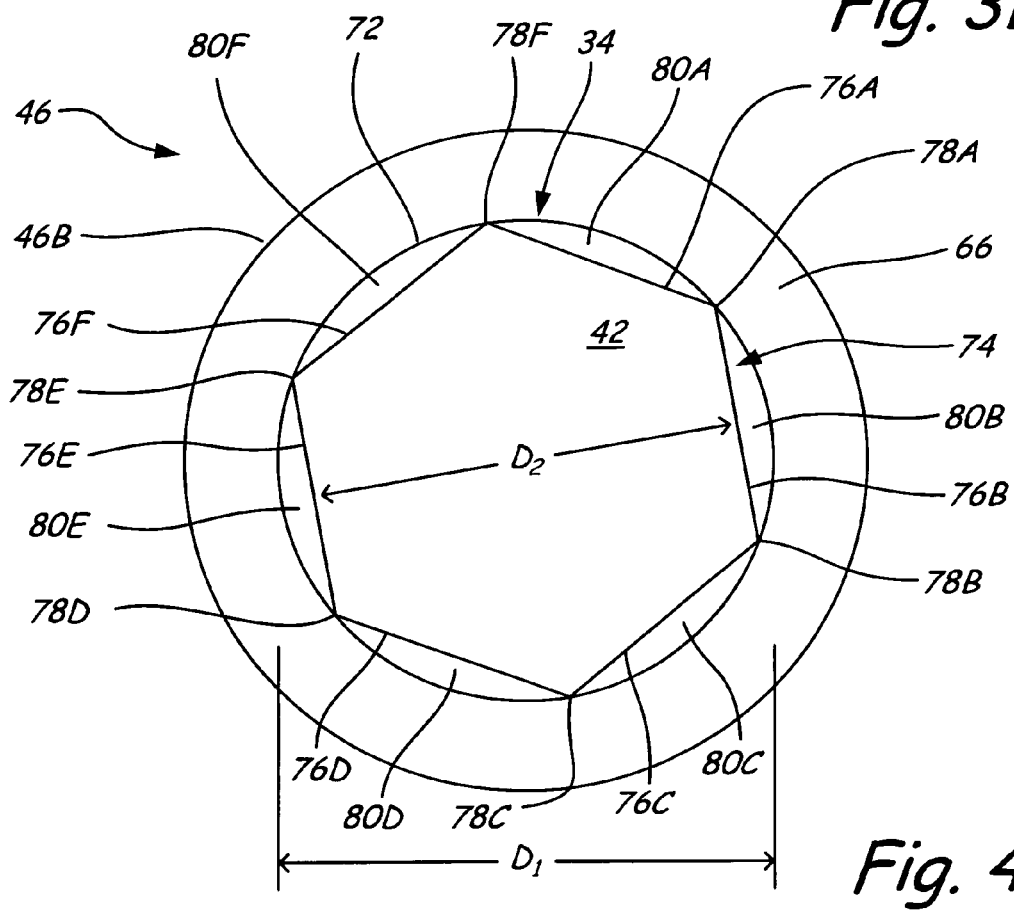
FIG. 4 shows a close-up view of the isolation path and hexagonal flame arrestor of FIG. 3B, as taken at callout B.

FIG. 4 shows a close-up view of isolation path 34 and hexagonal flame arrestor 42, as taken at callout B of FIG. 3B. Isolation path 34 comprises diameter $D_1$ and interior wall 72. Flame arrestor 42 comprises exterior wall 74, which includes panels 76A-76F and edges 78A-78F. Panels 76A-76F circumscribe a circle having diameter $D_2$. Flame arrestor 42 fits into isolation path 34 to form passages 80A-80F between interior wall 72 and exterior wall 74. The cross-sectional profiles of isolation path 34 and flame arrestor 42 differ to produce such paths. In the embodiment shown, isolation path 34 has a circular cross-sectional profile and flame arrestor 42 has a hexagonal cross-sectional profile. Isolation path 34 extends uniformly and linearly through plug 46. Flame arrestor 42 extends linearly and uniformly through isolation path 34. Flame arrestor 42 extends co-axially within isolation path 34. As such, the cross-sectional profiles of isolation path 34, flame arrestor 42 and passages 80A-80F are uniform across length L (FIG. 2) for the embodiment shown.

Isolation path 34 is formed using conventional machining techniques, such as drilling. After drilling, isolation path 34 is cleaned using any conventional method to remove lubricant or debris left over from the machining operation. Isolation path 34 is cleaned to prevent contamination of hydraulic fluid later introduced into isolation path 34 which may affect operation of sensor 30 (FIG. 2). In one embodiment, flame arrestor 42 is formed of standard, commercially available material. For the described embodiments, flame arrestor 42 comprises 303 stainless steel hex plug having a minor width ($D_2$) of approximately 0.125 inch (~3.175 mm). The hex plug can be annealed or cold worked as needed, depending on the insertion process used.

Flame arrestor 42 is inserted into isolation path 34 using any suitable method such that flame arrestor 42 is held or retained in a fixed relationship with respect to isolation path 34. In one embodiment, flame arrestor 42 is press fit into isolation path 34, which can be accomplished in at least two ways. First, flame arrestor 42 can be press fit into isolation path 34 with a length protruding from isolation path 34 so that flame arrestor 42 and end surface 46B can be shaped together to form convolution 68. After machining, convolution 68 is de-burred using a thermal energy method or an abrasive flow machining or pressure flush process, for example. Second, flame arrestor 42 can be press fit into isolation path 34 to recede behind end surface 46B after convolution 68 is machined. In such examples, isolation path 34 is drilled using a #29 drill bit having a diameter of approximately 0.136 inch (~3.45 mm).

In another embodiment, flame arrestor 42 is swaged into place within isolation path 34. For example, with flame arrestor 42 positioned within isolation path 34, a stop/back riveting technique is used to hold flame arrestor 42 in place while a pneumatic riveting or hydraulic press technique is used to drive flame arrestor 42. In such an example, isolation path 34 is drilled using a #28 drill bit having a diameter of approximately 0.1405 inch (~3.569 mm). In both press fitting and swaging insertion techniques, flame arrestor 42 is put into compression within isolation path 34 such that flame arrestor 42 is frictionally held in place without the aid of other features, such as threads. However, in yet other embodiments, flame arrestor 42 can be threaded into isolation path 34, as discussed with reference to FIGS. 6 and 7. In still other embodiments, flame arrestor 42 may be thermally fit into isolation path 34 using conventional techniques. For example, isolation path 34 may be heated and expanded before insertion of flame arrestor 42, thereby allowing interior wall 72 to shrink around exterior wall 74.

In any embodiment, edges 78A-78F engage interior wall 72 to secure flame arrestor 42 within isolation path 34. These engagements divide isolation path 34 into several small paths. As can be seen in FIG. 4, the cross-sectional area of flame arrestor 42 occupies much of the cross-sectional area of isolation path 34, thereby reducing the overall flow path available within isolation path 34 for hydraulic fluid. Each of the smaller paths has flame-quenching characteristics. For example, based on length L (FIG. 2) of isolation path 34, each of passages 80A-80F will quench a flame traveling through isolation path 34. As can be seen in FIG. 4, the distance between interior wall 72 and exterior wall 74 varies within each of passages 80A-80F within a single plane transverse to isolation path 34 to provide a varying gap distance that both holds flame arrestor 42 in place and allows for the flow of hydraulic fluid.

Flame arrestor 42 and isolation path 34 provide improvements over conventional flame quenching paths used in transmitter plugs and flanges. For example, a conventional plug 46 having a 1 inch (~2.54 cm) length L will typically use a circular flame-quenching path having a bore diameter of approximately 0.20 inch (~5.08 mm). This results in a cross-sectional area of approximately 0.00031 inches squared (~0.2 mm$^2$) and a perimeter of approximately 0.063 inch (~1.6 mm). This yields a perimeter to area (P/A) ratio of approximately 200 in/in$^2$, as summarized in Table 1.

Using a 0.125 inch (~3.18 mm) [D$_2$] hex plug inserted into a 0.14 inch (~3.56 mm) bore [D$_1$], the described embodiment results in a cross-sectional area of approximately 0.00266 inches squared (~1.72 mm$^2$) and a perimeter of approximately 0.860 inch (~21.84 mm). This yields a P/A ratio of approximately 322.8 in/in$^2$, as summarized in Table 2.

TABLE 1

Conventional Flame-Quenching Path

| | |
|---|---|
| Bore Size | 0.020 in (0.508 mm) |
| Min. Gap | 0.020 in (0.508 mm) |
| Area Formula | $\pi r^2$ |
| Radius | r = 0.010 in (0.254 mm) |
| Total Flow Path Area | 0.00031 in$^2$ (0.2 mm$^2$) |
| Perimeter Formula | $2\pi r$ |
| Total Flow Path Perimeter | 0.063 in (1.6 mm) |
| Ratio of Perimeter to Area | 200 in/in$^2$ (8 mm/mm$^2$) |

TABLE 2

Flame Arrestor of Present Invention

| | |
|---|---|
| Bore Size | 0.140 in (3.56 mm) |
| Min. Gap | 0.009 in (0.229 mm) |
| Area Formula | $\pi r^2 - 2.598 R^2$ |
| Radius | R = 0.070 in (1.778 mm) |
| Total Flow Path Area | 0.00266 in$^2$ (1.72 mm$^2$) |
| Perimeter Formula | $2\pi R + 6R$ |
| Total Flow Path Perimeter | 0.860 in (21.84 mm) |
| Ratio of Perimeter to Area | 322.8 in/in$^2$ (12.8 mm/mm$^2$) |

As can be seen from Tables 1 and 2, the perimeter to area ratio of the present invention is increased over sixty percent from conventional flame quenching paths. As can be seen in Table 3 below, flame arrestor 42 and isolation path 34 increase both the perimeter and cross-sectional area of the flow path. Thus, even though a larger hole is machined into the process transmitter slab, which can be done inexpensively and cleanly, improved flow path geometries result.

TABLE 3

Area & Perimeter Ratios of Present Invention vs. Conventional Flame Path

| | |
|---|---|
| Ratio of Areas | ~8.5:1 |
| Ratio of Perimeters | ~13.6:1 |

With the present invention, the area of the flame path is increased eight and half times and the perimeter of the flame path is increased over thirteen and a half times, as compared to conventional flame-quenching paths without a flame arrestor. This improves performance of transmitter 12 (FIG. 1) in a variety of aspects. The increased total cross-sectional area of the flow path, as provided by passages 80A-80F, allows for additional fill fluid to be present in the hydraulic system, which can reduce temperature-related performance variations of the sensor. Also, increased cross-sectional area of the flow path can improve sensor responsiveness by providing a greater surface area through which the process pressure can react. The increased perimeter of the flow path improves the flame-quenching performance of isolation path 34. Interior wall 72 and exterior wall 74 provide more surface area to absorb heat of flames traveling through passages 80A-80F, which allows for more rapid extinguishing of the flames.

Because the cross-sectional area of isolation path 34 can be divided between many smaller paths, isolation diaphragm 36 (FIG. 2) placed over isolation path 34 is more fully supported by flame arrestor 42. Thus, the robustness of isolation diaphragm 36 is improved with reduced potential for rupture, such as when exposed to over-pressure conditions. Furthermore, because the present invention allows for multiple, small flame paths to be produced, each having a small cross-sectional area, the length of each path can be reduced to provide an adequate L/D ratio to extinguish flames. Thus, the length L of plug 46 (FIG. 2) and the overall size envelope of transmitter 12 (FIG. 1) can be reduced. Also, being able to adjust the length of each flow path based on the size of isolation path 34 and flame arrestor 42 without affecting flame-quenching capabilities allows for the use of offset isolation diaphragms in co-planar pressure transmitters.

Several smaller, independent flame paths are produced by providing a flame arrestor having a different cross-sectional profile than that of the isolation path. In the described embodiment, a hexagonal flame arrestor is used in a round isolation path. However, in other embodiments, other polygonal shaped flame arrestors, such as triangular, rectangular, square or octagonal, can be used to produce multiple flow paths in round or other curvilinear isolation paths. In yet other embodiments, a single flame path that mimics a conventional flame-quenching path can be produced with a flame arrestor having a different cross-sectional profile than that of the isolation path, as discussed with reference to FIG. 5.

Figure 5:
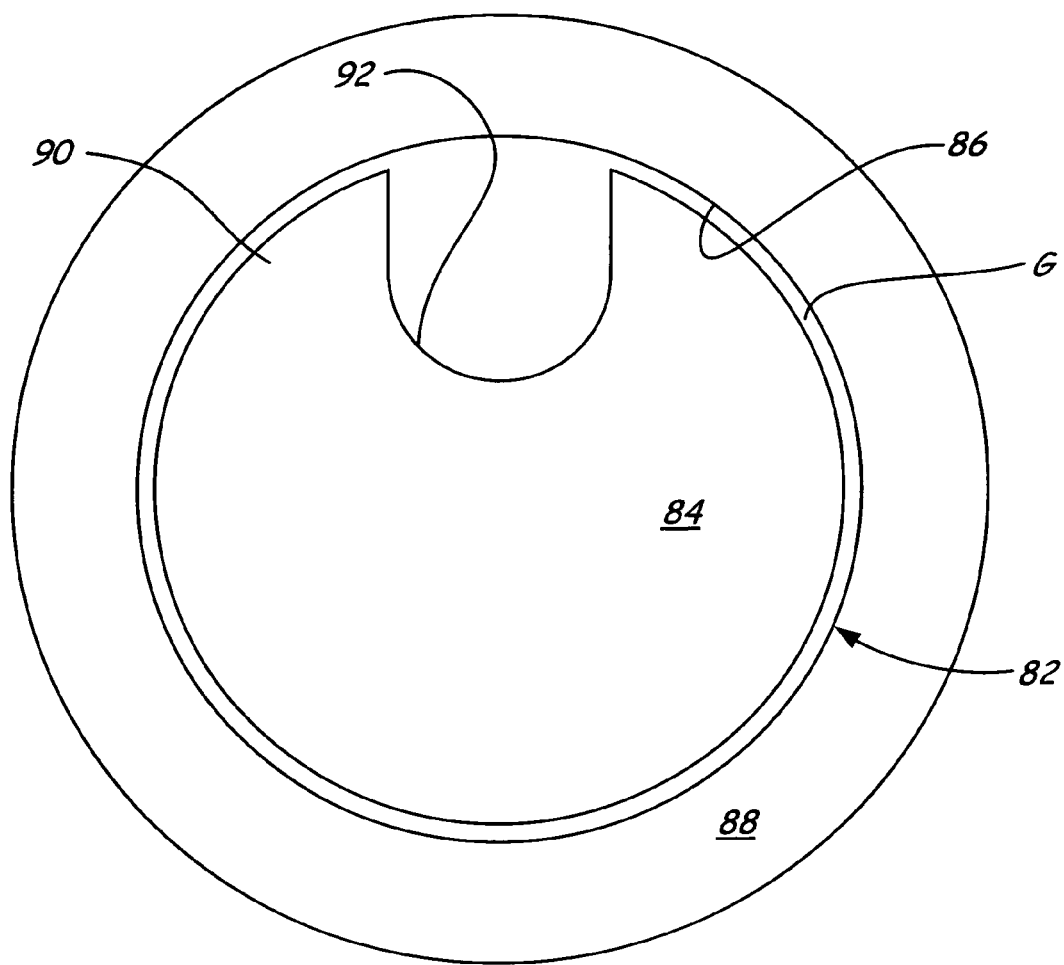
FIG. 5 shows a close-up end view of an isolation path in which a grooved flame arrestor is inserted.

FIG. 5 shows a close-up end view of isolation path 82 in which grooved flame arrestor 84 is inserted. Isolation path 82 comprises a circular bore having interior wall 86 that extends into slab 88, which comprises a transmitter component such as a plug or a flange. Flame arrestor 84 comprises a cylindrical body having exterior wall 90 having groove 92. In practice flame arrestor 84 is tightly fitted into isolation path 82. However, gap G between flame arrestor 84 and interior wall 86 is shown in FIG. 5 for clarity. As can be seen in FIG. 5, gap G varies around the perimeter of flame arrestor 84 due to the presence of groove 92.

Flame arrestor 84 comprises a grooved pin which can be produced by drawing a wire or bar through a die having the shape of the desired groove. The embodiment shown, flame arrestor 84 includes a semi-circular shaped groove 92. However, other custom shaped grooves, such as square or parabolic, can be used. In the embodiment shown, groove 92 is shaped to approximate the cross-section of a conventional circular flame-quenching path such that the diameter of groove 92 is approximately 0.020 inch (~0.508 mm). As such, conventional flame-quenching characteristics can be achieved with inexpensive and clean machining operations. After shaping of groove 92, flame arrestor 84 is inserted into path 82 by any conventional means such as swaging or press fitting. Other embodiments of the flame arrestor and isolation path of the present invention can produce single flame-quenching paths using differing cross-sectional profiles, as discussed with reference to FIGS. 6 and 7.

Figure 6:
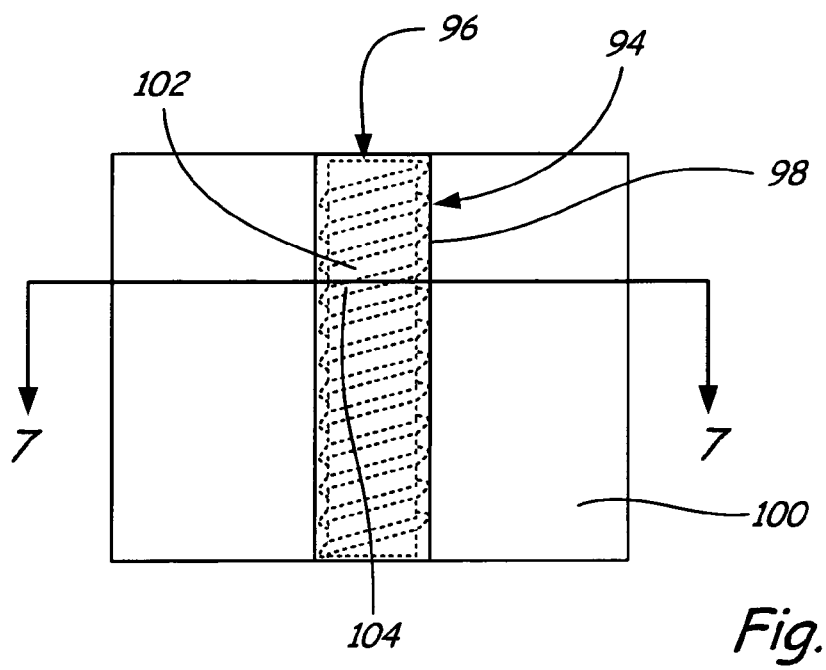
FIG. 6 shows a side cross-section of an isolation path in which a lobed helical flame arrestor is inserted.
Figure 7:
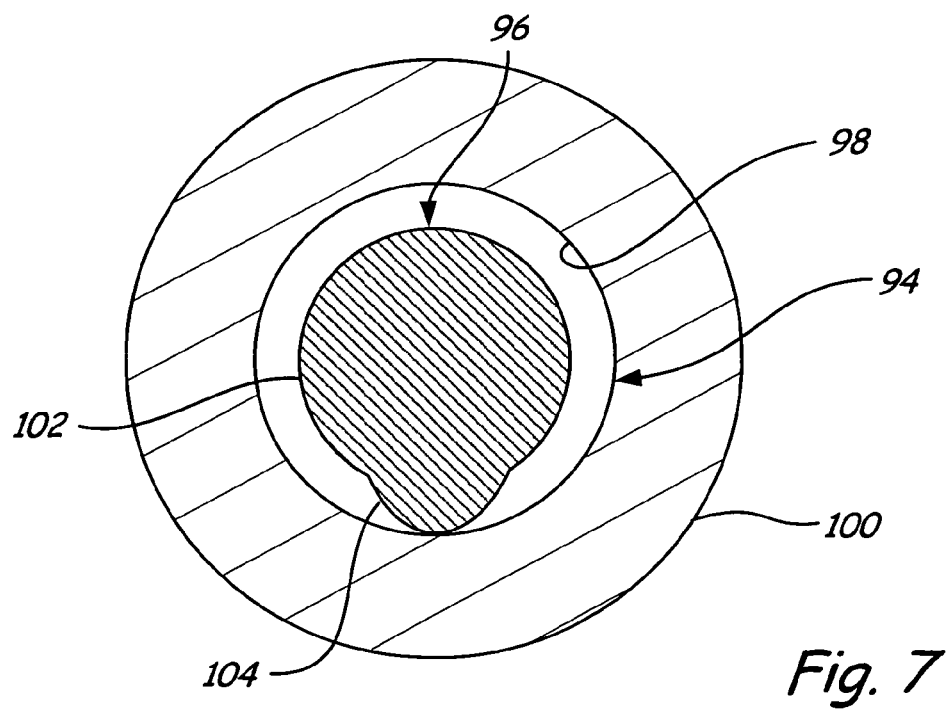
FIG. 7 shows an end cross-sectional view of the isolation path and helical flame arrestor of FIG. 6.

FIG. 6 shows a side cross-section of isolation path 94 in which lobed helical flame arrestor 96 is inserted. FIG. 7, which is discussed concurrently with FIG. 6, shows an end cross-sectional view of isolation path 94 and helical flame arrestor 96 of FIG. 6. Isolation path 94 comprises a circular bore having interior wall 98 that extends into slab 100, which comprises a transmitter component such as a plug or a flange. Flame arrestor 96 comprises a helical body having exterior wall 102 and coil 104. The gap between flame arrestor 96 and isolation path 94 is exaggerated in FIG. 7 for clarity. As with the embodiments of FIGS. 4 & 5, the gap distance between interior wall 98 and exterior wall 102 varies around the perimeter of flame arrestor 96.

Flame arrestor 96 comprises a generally cylindrical rod around which coil 104 is wound as an integrated feature. Flame arrestor 96 is inserted into isolation path 94 so as to be held firmly in place, such as by the previously discussed swaging or press fitting techniques. As shown in FIG. 7, the cross-sectional profiles of interior wall 98 and exterior wall 102 are different. For example, interior wall 98 forms a circular cross-sectional profile, while exterior wall 98 forms a lobed cross-sectional profile by the inclusion of coil 104. The differing cross-sectional profiles produce a single flow path through isolation path 94. The flow path wraps around exterior wall 102 in a helical or spiral fashion, which elongates the effective length of the flame-quenching path without increasing the length of slab 100 (e.g. length L of plug 46). The elongated flow path increases the flame-quenching properties of isolation path 94 by increasing the surface area of the path that absorbs heat.

In one embodiment, flame arrestor 96 comprises a conventional threaded body such as a screw or bolt, wherein coil 104 comprises conventional exterior threading. In such embodiments, flame arrestor 96 can be threaded into mating interior threading provided on interior wall 98. Additionally, in other embodiments of the invention, such as described with reference to FIGS. 4 and 5, flame arrestors of other cross-sectional profiles can be provided with threads. For example, edges 78A-78F of flame arrestor 74 can be provided with threads to mate with matching threads provided on interior wall 72.

The isolation path and flame arrestor combination of the present invention achieves advantages over previous flame arrestors and flame-quenching paths. The present invention is easier and more inexpensive to manufacture. Conventional machining operations can be used in place of more expensive EDM methods. Conventionally machined holes provide cleaner passageway that reduce the amount of dirt and loose material trapped in the passageway, thereby reducing potential sensor performance issues such as altered fill fluid capacitance. EDM methods also provide porous holes that can trap moisture and further degrade fill fluid performance. Furthermore, in addition to increasing the cross-sectional area and perimeter of the flame-quenching flow path, the length of the flow path provided by the present invention can also be reduced as compared to previous designs.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A process transmitter for sensing a process variable, the process transmitter comprising:
   a transmitter housing having an interior;
   a sensor disposed within the interior for sensing a process variable of an industrial process and generating a sensor signal;
   transmitter circuitry disposed within the interior and connected to the sensor;
   a passageway in communication with the sensor and extending through the interior of the transmitter housing, the passageway having a first cross-sectional profile; and
   a flame arrestor fabricated of bar stock and positioned in the passageway, the flame arrestor having a second cross-sectional profile different from the first cross-sectional profile;
   wherein the second cross-sectional profile comprises a hexagonal shape; and
   wherein the flame arrestor produces a path in an interior of the passageway having a smaller cross-sectional area than that of the first cross-sectional profile of the passageway.

2. The process transmitter of claim 1 wherein distances between the passageway and the flame arrestor vary in a single plane extending transversely through the passageway.

3. The process transmitter of claim 1 wherein:
   the first cross-sectional profile extends uniformly and linearly along a first length of the passageway; and
   the second cross-sectional profile extends uniformly and linearly along a second length of the flame arrestor;
   wherein the first and second lengths are co-axial.

4. The process transmitter of claim 1 wherein the flame arrestor includes a plurality of longitudinal edges extending along a length of the flame arrestor that engage the passageway.

5. The process transmitter of claim 1 wherein the flame arrestor divides the interior of the passageway into a plurality of paths each having a smaller cross-sectional area than that of the first cross-sectional profile of the passageway.

6. The process transmitter of claim 5 wherein the plurality of paths have in total a greater surface area and perimeter than that of the first cross-sectional profile of the passageway.

7. The process transmitter of claim 1 wherein the first cross-sectional profile comprises a circular shape.

8. The process transmitter of claim 1 wherein the passageway extends from the sensor to an exterior of the transmitter housing to form a vent path.

9. The process transmitter of claim 1 wherein the passageway extends from the sensor to an isolation diaphragm attached to the transmitter housing to form an isolation path, the isolation path being further filled with a hydraulic fluid.

10. The process transmitter of claim 1 wherein the flame arrestor is pressed within the passageway so as to be frictionally held in place without the use of threads.

11. A pressure transmitter for sensing a pressure of a process fluid, the pressure transmitter comprising:
    a sensor module comprising a sensor for sensing a process variable of an industrial process and generating a sensor signal;
    transmitter circuitry connected to the sensor for processing the sensor signal;
    a hydraulic relay system that provides a communication channel between the process fluid and the pressure sensor, the hydraulic relay system comprising:
        a passageway extending into the sensor module and having an interior wall;
        a polygonal flame arrestor positioned within the passageway and having an exterior wall that defines with the interior wall of the passageway a flow path space, the flame arrestor engaging the interior wall to define a varying gap distance between the interior wall and the exterior wall;
        wherein the exterior wall of the flame arrestor comprises:
            a plurality of polygonal faces spaced around the exterior wall and that extend along an entire length of the exterior wall; and
            a plurality of edges interposed between the plurality of polygonal faces and that extend along the entire length of the exterior wall;
            wherein the plurality of edges contact the interior wall such that the plurality of polygonal faces divide the passageway into a plurality of paths;
        a hydraulic fluid in the flow path space; and
        an isolation diaphragm positioned at one end of the passageway.

12. The pressure transmitter of claim 11 wherein a ratio of a length of the passageway to a cross-sectional area of each of the plurality of paths is sufficient to provide a flame-quenching path.

13. A method of manufacturing a flame arrestor for use in a process transmitter, the method comprising:
    machining a through-hole in a slab shaped to be a transmitter component, the through hole having a circular cross-sectional profile; and
    inserting an elongate flame arrestor into the through-hole, the flame arrestor having a hexagonal cross-sectional profile that defines at least one path between the through-hole and the flame arrestor and that engages an interior surface of the through-hole so that the flame arrestor is held in place within the through-hole.

14. The method of claim 13 and wherein:
    machining the through-hole comprises drilling the through-hole; and
    inserting an elongate flame arrestor comprises press fitting the flame arrestor into the through-hole.

15. The method of claim 13 wherein:
    machining the through-hole comprises drilling the through-hole; and
    inserting an elongate flame arrestor comprises swaging the flame arrestor into place within the through-hole.

16. The method of claim 13 and further comprising:
    machining the slab to form a convolution around the through-hole; and
    deburring the convolution.

17. The method of claim 13 and further comprising cleaning the machined through-hole before inserting the flame arrestor.

18. The method of claim 13 wherein:
    the slab has a length corresponding to a length of the through-hole; and
    the through-hole is machined to have a larger diameter than a hypothetical path extending through the slab to provide a flame arresting path commensurate with the length of the slab.

19. A process transmitter for sensing a process variable, the process transmitter comprising:
    a transmitter housing having an interior;
    a sensor disposed within the interior for sensing a process variable of an industrial process and generating a sensor signal;
    transmitter circuitry disposed within the interior and connected to the sensor;
    a passageway in communication with the sensor and extending through the interior of the transmitter housing from the sensor to an exterior of the transmitter housing to form a vent path, the passageway having a first cross-sectional profile; and
    a flame arrestor positioned in the passageway, the flame arrestor having a second cross-sectional profile different from the first cross-sectional profile;
    wherein the flame arrestor produces a path in an interior of the passageway having a smaller cross-sectional area than that of the first cross-sectional profile of the passageway.

20. A process transmitter for sensing a process variable, the process transmitter comprising:
    a transmitter housing having an interior;
    a sensor disposed within the interior for sensing a process variable of an industrial process and generating a sensor signal;
    transmitter circuitry disposed within the interior and connected to the sensor;
    a passageway in communication with the sensor and extending through the interior of the transmitter housing, the passageway having a first cross-sectional profile; and
    a flame arrestor having a homogeneous cross-sectional profile and positioned in the passageway, the flame arrestor having a second cross-sectional profile different from the first cross-sectional profile;
    wherein the flame arrestor includes a plurality of longitudinal edges extending along a length of the flame arrestor that engage the passageway; and wherein the flame arrestor produces a path in an interior of the passageway having a smaller cross-sectional area than that of the first cross-sectional profile of the passageway.

* * * * *